(12) United States Patent
Bouru (10) Patent No.: US 7,802,964 B2
(45) Date of Patent: Sep. 28, 2010

(54) LINK DEVICE OF CONTROLLABLE VARIABLE LENGTH

(75) Inventor: Michel Andre Bouru, Montereau sur le Jard (FR)

(73) Assignee: SNECMA, Paris (FR)

( * ) Notice: Subject to any disclaimer, the term of this patent is extended or adjusted under 35 U.S.C. 154(b) by 1085 days.

(21) Appl. No.: 11/500,989

(22) Filed: Aug. 9, 2006

(65) Prior Publication Data

US 2007/0068303 A1   Mar. 29, 2007

(30) Foreign Application Priority Data

Aug. 30, 2005   (FR) .................................. 05 08856

(51) Int. Cl.
*F01D 17/16* (2006.01)
*F16B 7/00* (2006.01)

(52) U.S. Cl. .......................... 415/160; 415/149.4; 74/25
(58) Field of Classification Search ................. 415/148, 415/149.5, 160, 149.4; 74/25
See application file for complete search history.

(56) References Cited

U.S. PATENT DOCUMENTS

| | | | | |
|---|---|---|---|---|
| 1,989,413 A | * | 1/1935 | Hagen ......................... | 415/160 |
| 2,823,700 A | * | 2/1958 | Christensen .............. | 415/149.4 |
| 2,933,234 A | * | 4/1960 | Neumann ................. | 415/149.4 |
| 3,056,541 A | | 10/1962 | Foweraker | |
| 3,069,070 A | * | 12/1962 | Macaluso et al. ........... | 415/148 |
| 3,146,585 A | * | 9/1964 | Gulick ..................... | 415/149.4 |
| 5,518,365 A | * | 5/1996 | Baets et al. .................. | 415/160 |
| 6,669,442 B2 | * | 12/2003 | Jinnai et al. ................. | 415/160 |

FOREIGN PATENT DOCUMENTS

DE    3820642 A1    12/1989

* cited by examiner

*Primary Examiner*—David B Jones
(74) *Attorney, Agent, or Firm*—Oblon, Spivak, McClelland, Maier & Neustadt, L.L.P.

(57) ABSTRACT

A controllable variable length link device is disclosed. The device includes a first half-link having a first end connected to a driving system and a second end, a second half-link having a first end connected to a driven system and a second end, a rotary displacement member including a rotator shaft and a rotary head cooperating with the second ends of the half-links to bring about opposite movement of the half-links, a bearing unit in which the rotator shaft is mounted, respective guiding units which guide the two half-links in translation in at least two parallel directions, the guiding units being mechanically connected to the bearing means; and a driving unit which drives the shaft in rotation in both directions in accordance with a predetermined relationship.

15 Claims, 7 Drawing Sheets

LINK DEVICE OF CONTROLLABLE VARIABLE LENGTH

The present invention consists in a link device of controllable variable length usable in particular, although not exclusively, for the transmission kinematics in a variable pitch vane control system, a guide vane control device using a link of that kind, a turbomachine compressor using a control device of that kind, and a jet engine using said link device.

BACKGROUND OF THE INVENTION

Turbomachine compressors, and turbojet stators in particular, may include a variable-pitch guide vane stage arranged on a casing. The position of the vanes is controlled by a rotary ring that is connected to each guide vane by a link. Thus the angle of attack of the vanes can be controlled as a function of flight conditions by a control system that drives the rotation of the ring. The link of the invention can be used with advantage in the control system.

More generally, many kinematic systems use a link to transmit a driving rotary movement to a driven rotary movement. In prior art systems this link has a constant length.

Links of variable length are also known in the art but the length of the link can be modified only when the link is not operating.

In certain transmission systems it is necessary to be able to apply a relatively complex relationship governing the transmission from one rotary movement to another rotary movement.

An object of the present invention is to provide a link the length whereof may be varied when the link is operating.

It is equally beneficial for a link of the above kind to be fitted into the kinematic system as a replacement for a link of fixed length without having to modify the rest of the kinematic system.

SUMMARY OF THE INVENTION

A first object of the present invention is to provide a link device which, on the one hand, has a length that may be varied while it is operating and, on the other hand, is so constituted that it can be substituted for a link of fixed length in a kinematic transmission system.

To achieve the above object, the controllable variable length link device of the invention comprises:
  a first half-link having a first end for connection to a driving system and a second end,
  a second half-link having a first end for connection to a driven system and a second end,
  a rotary displacement member including a rotator shaft and a rotary head cooperating with said second ends of said links to bring about opposite movement of said half-links,
  bearing means in which said rotator shaft is mounted,
  respective means for guiding said two half-links in translation in at least two parallel directions, said drive means being mechanically connected to said bearing means, and
  means for driving said shaft in rotation in both directions.

Clearly, because the two half-links are joined together by a rotary displacement member including a rotator shaft, it is possible to assign to the rotary displacement member a rotation that yields a link length variation and therefore a relationship governing the kinematic relationship between the driving and driven systems.

Note also that the first ends of the two half-links are exactly the same as the ends of a conventional type link and that the link of the invention may be substituted for a conventional link in a kinematic system without the other portions thereof having to be modified.

The guide means of the link device preferably each comprise a portion of a half-link close to its second end having a cylindrical external surface with generatrices parallel to the axis of the half-link and a guide member rigidly connected to the bearing means having a passage conjugate with said cylindrical surface to guide movement in translation of the half-link.

The expression "cylindrical surface" is to be understood as referring to any surface generated by the movement of a generatrix along a closed curve, which may be a circle, an ellipse, a square, a rectangle, etc.

Clearly, thanks to these guide members, the relative travel of the two half-links is effected in a perfectly defined direction.

It preferably comprises a casing in which said bearing means and the two guide members are mounted.

In a first embodiment of the link device the rotary head of the rotary member is a yoke comprising two arms extending radially relative to said shaft, each arm being connected to the second end of one half-link.

Clearly, in this first embodiment, by imposing a particular rotation on the shaft of the rotary member, the lengths of the two half-links connected to the ends of the arms of the yoke will vary based on the relationship.

In a second embodiment of the link device each half-link has near its second end a rack portion and the head of the rotary member is a pinion meshing with said racks.

Clearly the second embodiment has the same advantages as the first and, moreover, provides for a greater stroke of each half-link than the first embodiment because the head of the rotary member can turn more than once.

A second object of the present invention is to provide a variable pitch guide vane control device comprising a link device of the above type.

A third object of the invention is to provide a turbomachine compressor comprising a link device of the above type.

A fourth object of the invention is to provide a turbomachine comprising a link device of the above type.

BRIEF DESCRIPTION OF THE DRAWINGS

Other features and advantages of the invention will become more clearly apparent on reading the following description of embodiments of the invention given by way of nonlimiting example. The description refers to the appended figures.

DETAILED DESCRIPTION OF THE PREFERRED EMBODIMENTS

Figure 1:
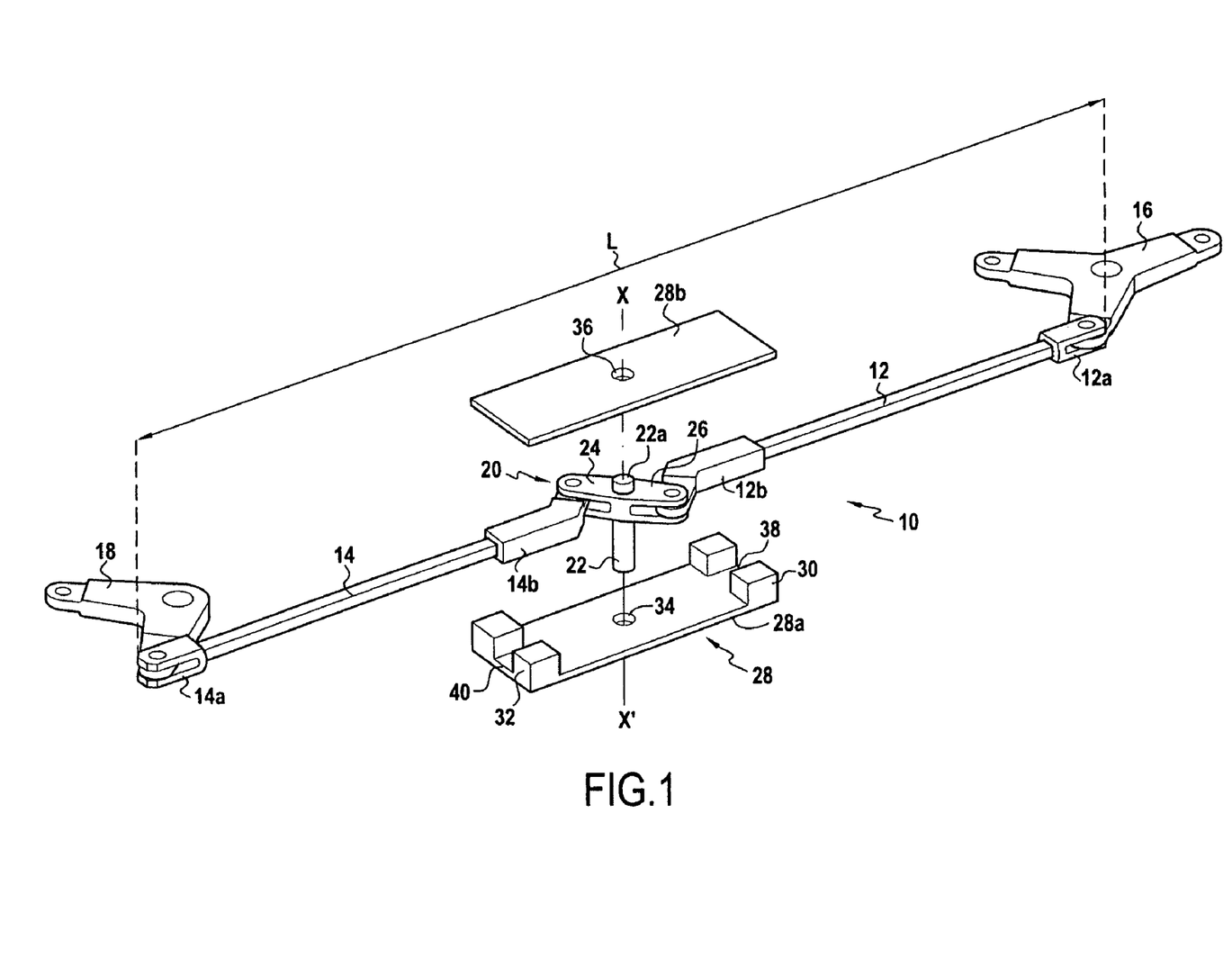
FIG. 1 is an exploded perspective view of a first embodiment of a simplified form of the link of the invention.

The whole of a first embodiment of the variable length link device 10 will be described first with reference to FIG. 1.

The link comprises two half-links 12 and 14 having respective first ends 12a and 14a respectively connected to a driving rotary system 16 and to a driven rotary system 18 and two ends 12b and 14b connected to a yoke system 20. The yoke 20 consists of a rotator shaft 22 and two arms 24 and 26 extending perpendicularly to the geometrical axis XX' of the shaft 22. The ends 12b and 14b of the half-links 12 and 14 are connected to the ends of the arms 24 and 26 of the yoke. The yoke 20 is mounted in a casing 28 formed, for example, by a lower plate 28a having two rims 30 and 32 at its ends and by an upper plate 28b fixed to the rims 30 and 32 of the lower plate. The lower plate 28a and the upper plate 28b, when fastened together, include two aligned bearings 34 and 36 in which are respectively mounted the shaft 22 for rotating the yoke and an extension 22a of that shaft.

The rims 30 and 32 at the ends of the lower plate 28a include two aligned passages 38 and 40 in which the ends 12b and 14b of the half-links 12 and 14 can slide. As explained in more detail later, the passages 38 and 40 constitute guide members for the ends of the half-links and therefore for the links.

It is clear how the first embodiment of the variable length link 10 works. A system for driving rotation of the shaft 22 of the yoke imposes thereon a specific rotation about the axis XX' relative to the casing 28. That rotation evidently brings about the rotation of the arms 24 and 26 of the yoke and therefore the modification of the total length L of the link. Imposing an appropriate rotation on the yoke 20 imposes on the link 10 a corresponding variation of its length based on a predetermined relationship.

Figure 2:
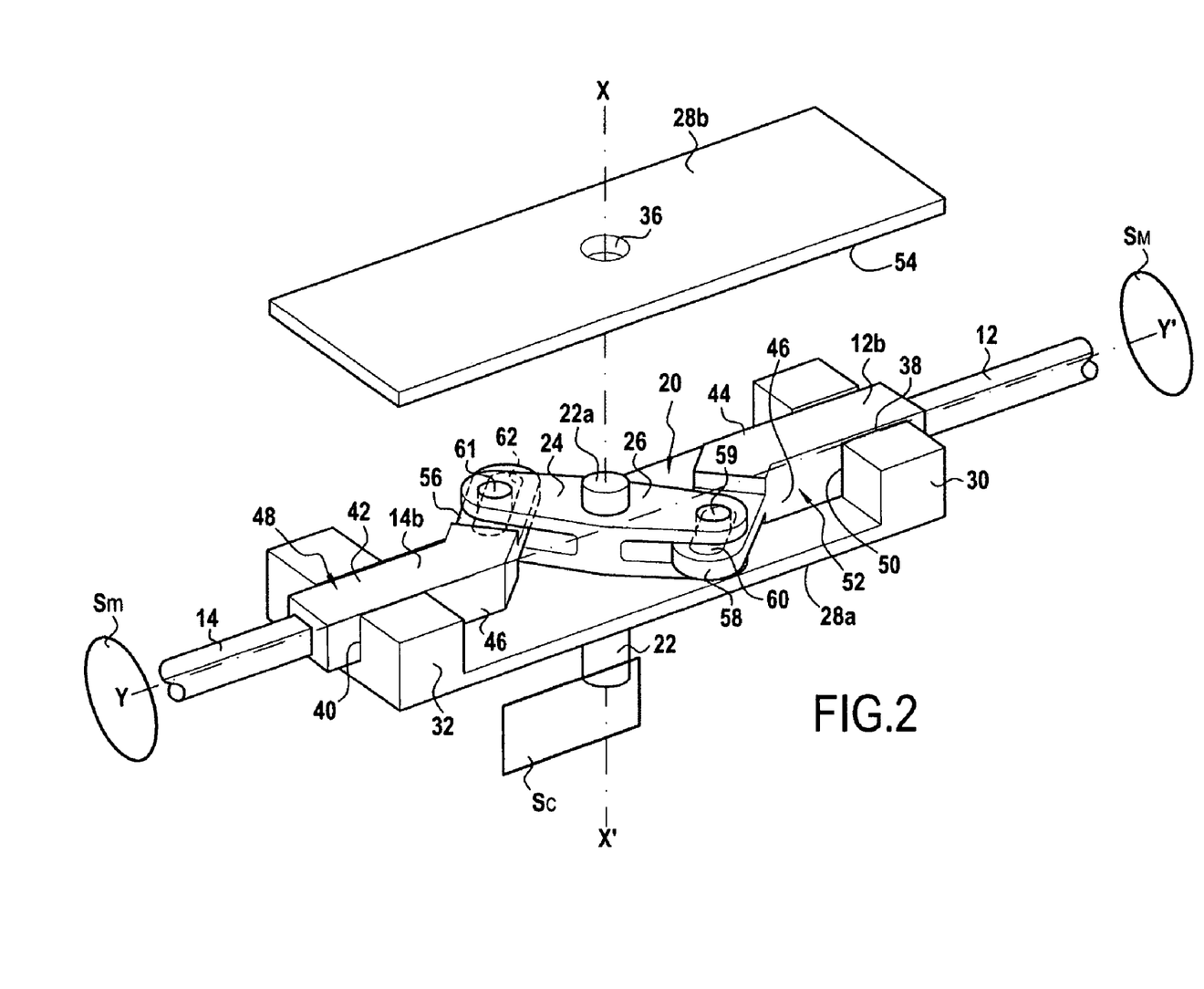
FIG. 2 is an exploded perspective view of part of the FIG. 1 link.

As shown better in FIG. 2, at their second ends 12b and 14b the half-links 12 and 14 consist of end parts 42 and 44 whose cross section is square or rectangular and larger than that of the main portion of the half-links. These end parts 42 and 44 therefore define two parallel lateral faces 46 and upper and lower faces 48. These four surfaces of the end parts 42 and 44 are precision ground to constitute guide faces. The end parts 42 and 44 are constrained to slide in the passages 38 and 40 formed in the rims 30 and 32 at the ends of the lower portion 28a of the casing 28. The lateral faces 50 of the passages 38 and 40 and the bottom 52 of those passages are also precision ground. Likewise the lower face 54 of the plate 28b of the casing. The end parts 42 and 44 of the half-links are therefore guided in translation by the passages 38 and 40 of the casing, those passages being aligned on a common axis YY' that constitutes the longitudinal axis of the link 10. The end parts 42 and 44 of the half-links terminate in a thinner portion 56 and 58 in which oblong holes 60 and 62 are formed for connecting the half-links to the arms 24 and 26 of the yoke 20. Moreover, the end parts 56 and 58 are cranked relative to the longitudinal axes of the half-links 12 and 14 so that the latter are aligned. The arms 24 and 26 of the yoke constitute brackets in which are engaged pins 59 and 61 penetrating the oblong holes 62 and 60.

Clearly, when the yoke is rotated, that rotation is converted into a movement in translation of the half-links 12 and 14 along the longitudinal axis YY' of the link. The holes 34 and 36 in which the shaft 22 of the yoke and its end 22a are fitted are preferably provided with bearings.

Figure 2A:
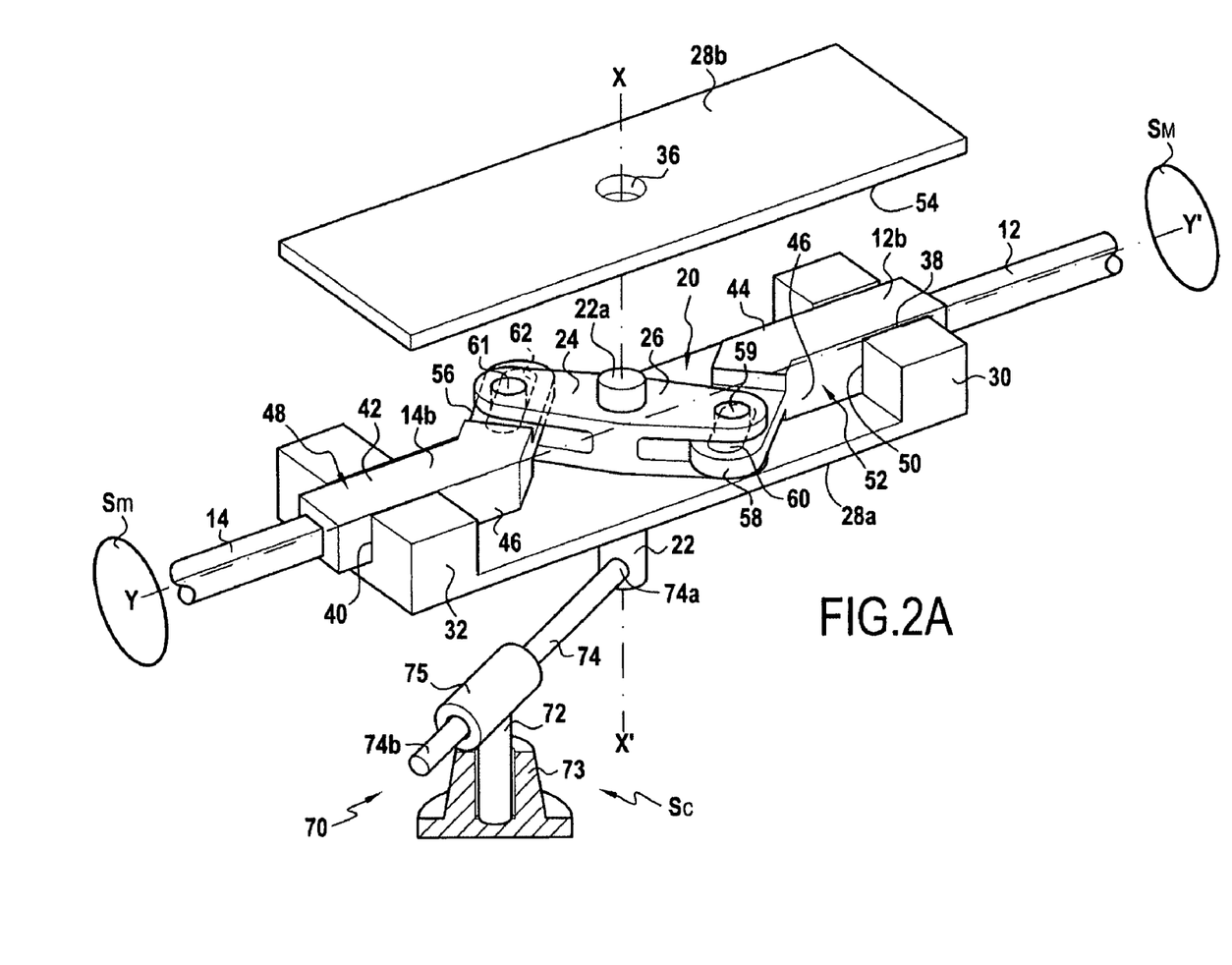
FIG. 2A is a partial exploded perspective view of the link equipped with a first control system.

As already mentioned briefly, various systems Sc may be used to control the rotation of the yoke 20 according to the required relationship of variation of the length of the link. FIG. 2A shows a first system 70 consisting of a half-shaft 72 mounted to pivot in a bearing 73 fastened to a fixed frame. This half-shaft, which is parallel to the drive shaft 22, is connected to a half-arm 74 orthogonal to its pivot axis. The end 74a of the half-arm 74 is fastened orthogonally to the shaft 22 of the yoke and its second end 74b slides in a sleeve forming a bearing 75 attached to the end of the vertical half-shaft 72.

There is obtained in this way a control of rotation of the shaft 22 of the yoke whereby, when the link is moved, the shaft 22 of the yoke is constrained to remain on a circle of variable radius centered on the geometrical axis of the half-shaft 72 of the drive system 70.

Figure 2B:
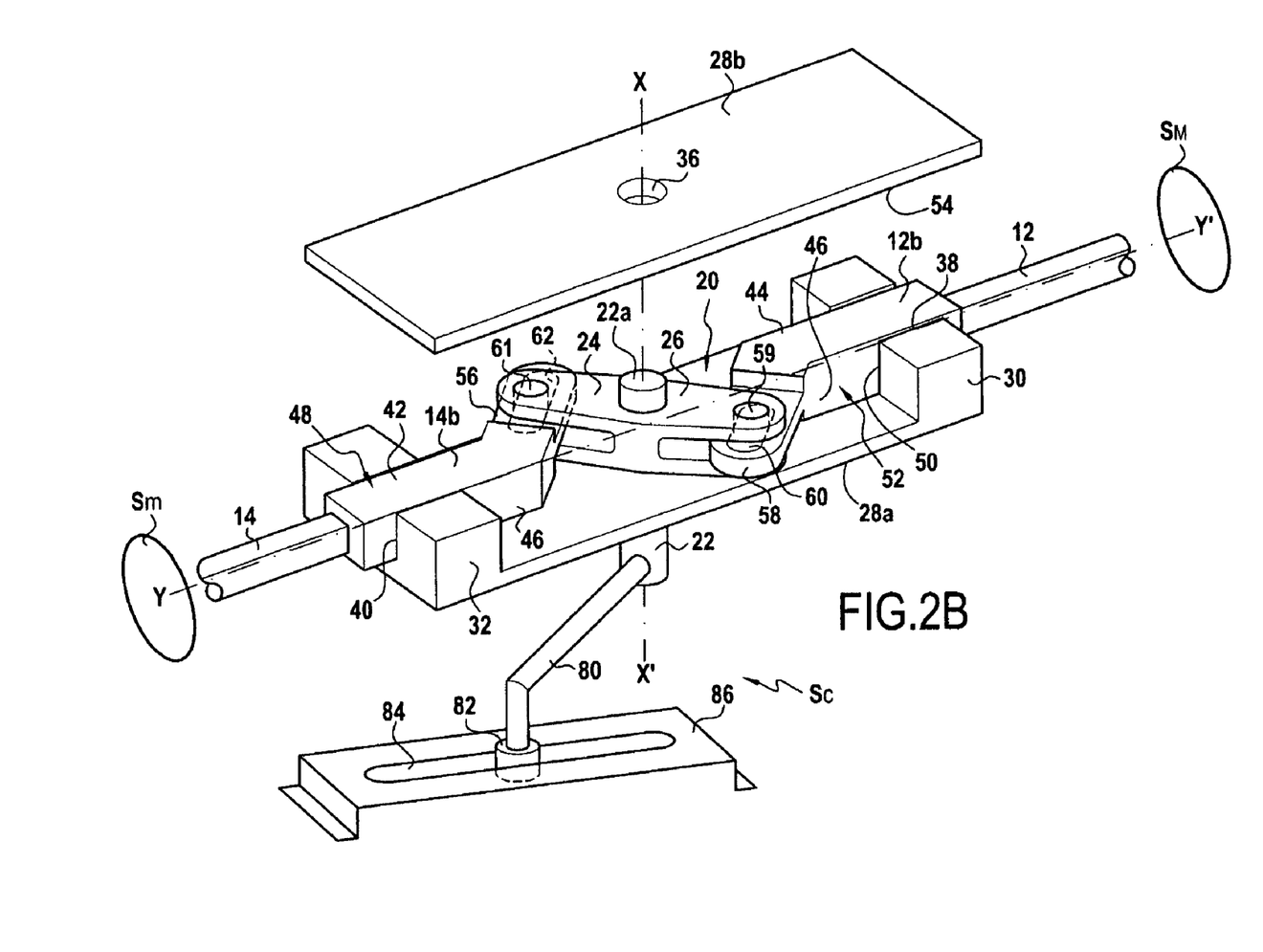
FIG. 2B is a partial exploded perspective view of the link equipped with a second control system.

FIG. 2B shows a second embodiment of the yoke rotation control drive system $S_c$. This system consists of an arm 80 orthogonal to the shaft 22 of the yoke whose second end 80a is equipped with a roller 82. The roller 82 is constrained to move in a slot 84 formed in a plate 86 fastened to a frame. The slot 84 has a shape adapted to impose on the shaft 22 of the yoke a rotation corresponding to the required variation of the length of the link 10 based on the relationship.

Figure 2C:
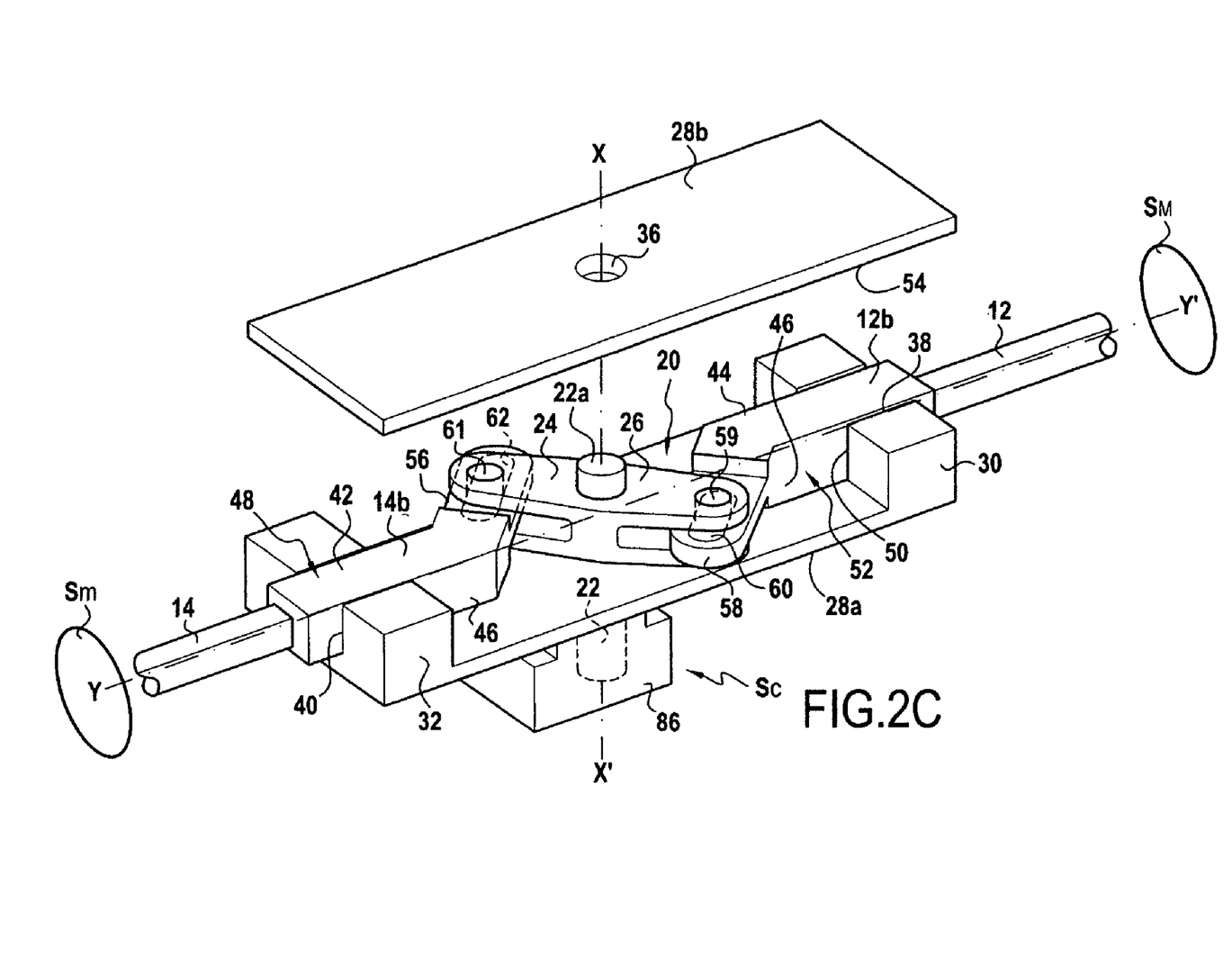
FIG. 2C is a partial exploded perspective view of the link equipped with a third control system.

FIG. 2C represents a third embodiment of the drive system $S_c$ of the rotation control of the yoke 20. This system consists of a stepper motor 86 whose casing is fixed directly to the lower portion 28a of the casing 28 of the link 10. A required variation of the length of the link based on the relationship is obtained by appropriately controlling the rotation of the stepper motor 86 in relation to the rotation of the driving system $S_m$.

Figure 3:
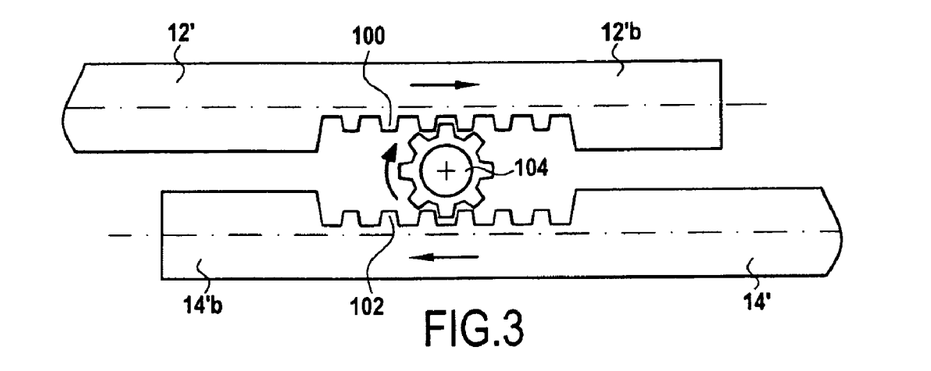
FIG. 3 is a partial plan view of a second embodiment of the link of the invention.

FIG. 3 is a highly simplified representation of a second embodiment of the variable length link of the invention. The latter again consists of two half-links 12' and 14'. The second ends 12'b and 14'b of the half-links are equipped on their facing faces with racks 100 and 102. The yoke 20 of the first embodiment is replaced by a toothed pinion 104 whose rotation axis is orthogonal to the longitudinal axes of the half-links 12' and 14'. Clearly the pinion 104 meshes with the racks 100 and 102 of the half-links 12' and 14'. Thus according to the direction of rotation imparted to the pinion 104, the half-links are moved in parallel opposite directions corresponding either to a reduction of the total length of the link or to an increase of that length.

Figure 4:
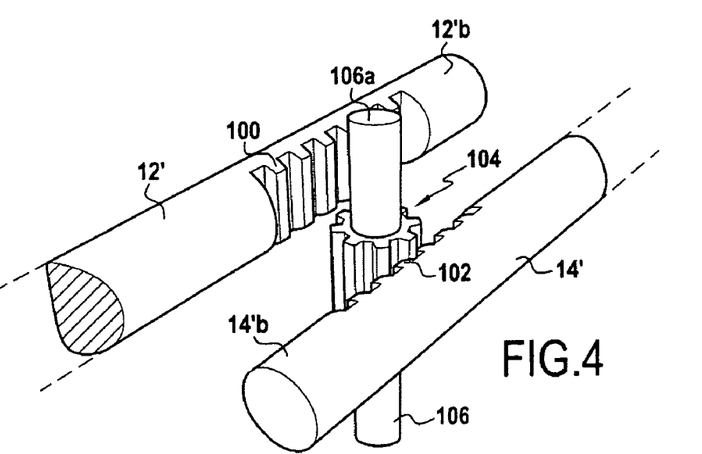
FIG. 4 is a partial perspective view of the FIG. 3 link.

FIG. 4 is a somewhat simplified exploded perspective view of the second embodiment. This figure shows the racks 100 and 102 of the half-links 12' and 14' and the drive pinion 104. The drive pinion 104 is fastened to a drive shaft 106 whose end 106a is extended beyond the pinion 104.

Figure 5:
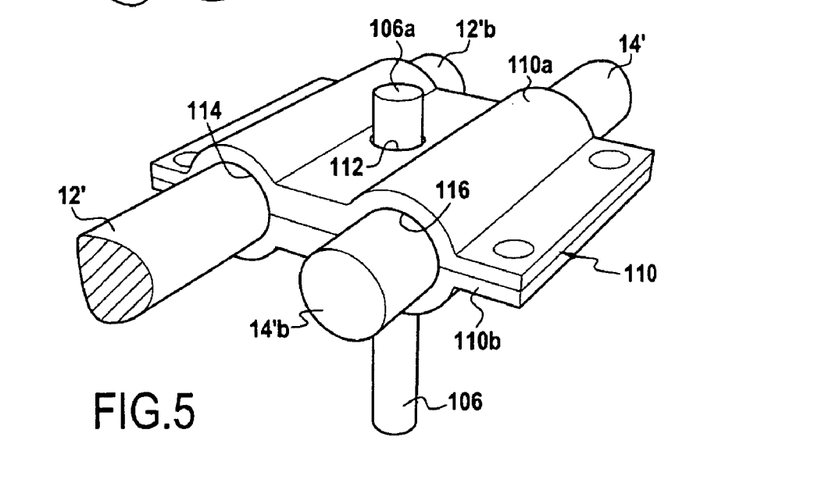
FIG. 5 is a perspective view of the whole of the second embodiment of the link.

FIG. 5 shows that the ends 12b and 14b of the half-links 12' and 14' and the drive pinion 104 are mounted in a casing 110 consisting of an upper half-shell 110a and a lower half-shell 110b. The casing 110 defines in its median plane two bearings 112 formed in the respective half-shells for mounting the drive shaft 106 and its extension 106a. The casing 110 also defines passages for guiding movement in translation of the ends 12'b and 14'b of the half-links. In the particular embodiment considered here, the half-links 12' and 14' have a circular cross section and the guide passages 114 and 116 therefore also have a circular cross section. These passages are parallel of course, because the half-links are offset. The casing 110 also defines an internal volume communicating with the guide passages 114 and 116 to receive the pinion 104 and enable it to mesh with the racks 100 and 102.

It goes without saying that the three drive systems fixing the rotation control of the shaft 22 of the yoke 20 of the first embodiment of the invention may be used to fix the rotation control of the pinion 104 used in the second embodiment.

It must also be noted that the second embodiment has all the advantages of the first embodiment. It additionally has the advantage of enabling greater variation of the total length of the link because, in the case of the yoke, the rotation angle of the latter is limited, whereas in the case of the pinion 104 meshing with the racks 100 and 102, there is no limit on the rotation of the pinion.

Figure 6:
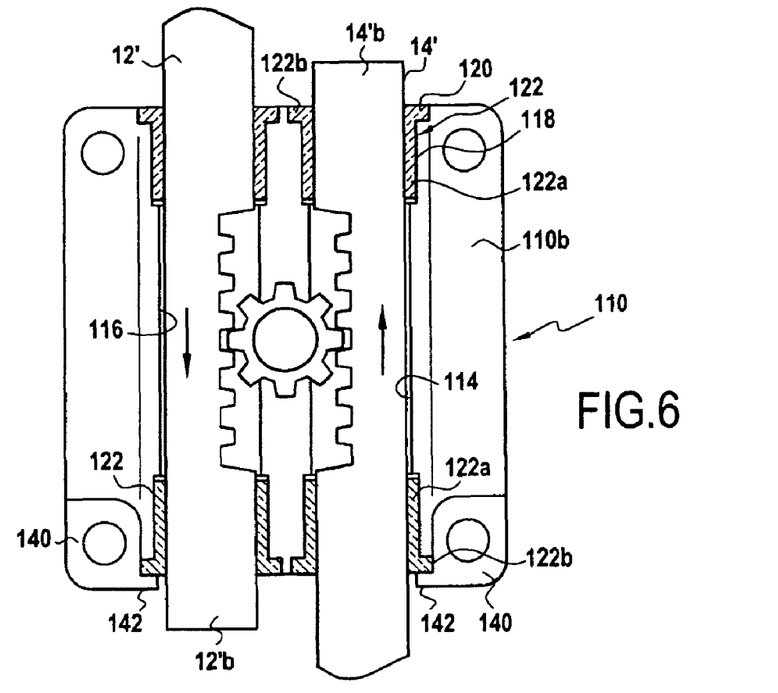
FIG. 6 is a view in median section of the central portion of the second embodiment of the link showing a system for adjusting the distance between the axes of the two half-links using rings forming cams.

In the second embodiment of the link, it is important to be able to adjust very accurately the distance between the axes of the two half-links 12' and 14' to ensure meshing with minimum backlash between the pinion 104 and the racks 100 and 102 of the half-links. FIG. 6 shows one embodiment of a system for adjusting this distance between the axes.

FIG. 6 represents one embodiment of the system for adjusting the distance between the axes of the two half-links 12' and 14'. Simplifying, this adjustment is obtained by means of cam rings mounted on the half-links on either side of the rack and engaging in passages formed in the casing.

More precisely, FIG. 6 represents the lower half-shell 110b of the casing 110. In each passage 114, 116 there is formed at its end a first internal bore 118 whose diameter is greater than the main diameter of the passages 114 and 116 with a shoulder formed by a spot facing 120 of greater diameter but of shorter length. In each of the bores 118, 120 is mounted a ring 122 forming a cam, each ring consisting of a tubular portion 122a engaged in the bore 118 and an end flange 122b engaged in the spot facing 120. The external faces of the rings forming cams are coaxial with the axes YY' of the passages 114 and 116 and the inside diameter d1 of these rings defines an inside surface cam to the axes YY' and adapted to receive the portions of the half-links disposed on respective opposite sides of the racks 100 and 102. These rings 122 form guide bearings for the half-links. Thus by adjusting the angular orientation of the four rings 122 forming cams, the distance e between the axes of the half-links 12' and 14' can be adjusted accurately.

It goes without saying that it must be possible to immobilize the rings 122 forming cams in translation and in rotation relative to the casing 110 when the angular orientation to obtain the required distance between the axes of the two half-links has been imparted to them.

Figure 6A:
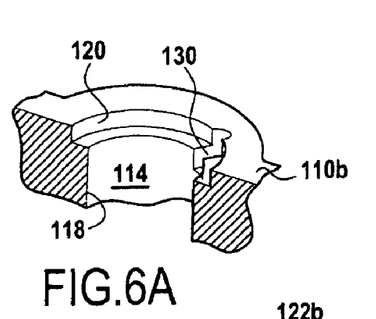
FIGS. 6A to 6C are perspective views of the components of the rings enabling them to rotate and for immobilizing them.
Figure 6B:
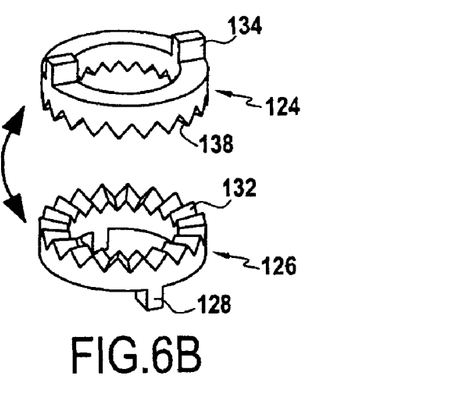
Figure 6C:
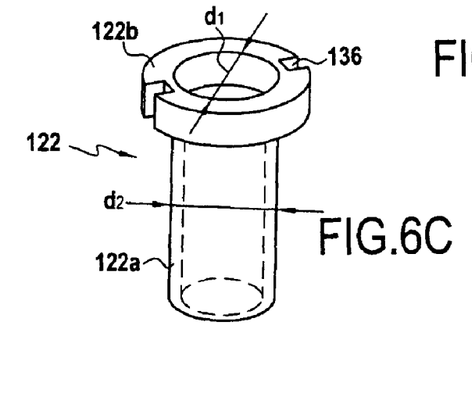

FIGS. 6A to 6C show one embodiment of the means for immobilizing the rings 122.

To enable rotation of the rings 122 and to immobilize them against rotation after they have been moved to the required angular position, two washers 124 and 126 are placed between the flange 122b and the bottom of the bore 120. The lower washer 126 has on its lower face two dogs 128 that are able to penetrate into grooves 130 formed in the bottom of the spot facing 120. The upper face of the washer 126 carries radially disposed teeth 132. The washer 124 has on its upper face two dogs 134 that are able to penetrate into notches 136 formed in the flange 122b of the ring 122. Its lower face is provided with teeth 138 conjugate with the teeth 132 of the washer 126. The assembly consisting of the ring 122 and the washers 124 and 126 is immobilized against movement in translation in the bores 118 and 120 by a plate 140 screwed to the casing 110. Each plate 140 has an extension 142 that bears on the outside face of the flange 122b of the ring 122.

When the plates 140 are screwed to the casing 110, the teeth 132 and 138 are interengaged and the ring is immobilized against rotation. On the other hand, if the plates are unscrewed, the teeth 132 and 138 are no longer interengaged and it is possible to turn the ring 122 and the washer 124 relative to the washer 126 constrained to rotate with the casing. Thanks to the large number of teeth 132 and 138, it is possible to adjust accurately the angular orientation of the rings 122 and therefore the distance between the axes of the half-links 12' and 14'.

It goes without saying that other systems could be used for adjusting the distance between the axes of the two half-links.

What is claimed is:

1. A controllable variable length link device comprising:
   a first half-link including a first end connected to a driving system and a second end;
   a second half-link including a first end connected to a driven system and a second end;
   a rotary displacement member including a rotator shaft and a rotary head cooperating with said second ends of said half-links to bring about opposite movement of said half-links;
   a bearing unit in which said rotator shaft is mounted;
   first and second guiding units which guide said first and second half-links, respectively, in translation in at least two parallel directions, said guiding units being mechanically connected to said bearing unit; and
   a driving unit which drives said shaft in rotation in both directions in accordance with a predetermined relationship, by which the length of the link may be varied based on the rotation of said shaft, when said link device is operating.

2. A link device according to claim 1, wherein each of said guiding units comprises a portion close to the second end of the respective half-link which includes a cylindrical external surface that is parallel to the axis of said half-link and a guide member mechanically connected to said bearing unit including a passage conjugate with said cylindrical surface.

3. A link device according to claim 2, further comprising a casing in which said bearing unit and said two guide members of said guiding units are formed.

4. A link device according to claim 2, wherein said rotary head of said rotary member is a yoke comprising two arms extending radially relative to said shaft, each arm being connected to the second end of one half-link.

5. A link device according to claim 4, wherein said passages in said guide members are aligned.

6. A link device according to claim 2, wherein each half-link has near its second end a rack portion and said head of said rotary member is a pinion meshing with said racks.

7. A link device according to claim 6, wherein said passages in said guide members have parallel axes.

8. A link device according to claim 6, wherein said guiding units further comprise two rings forming cams in which said half-links are slidably mounted, said rings being disposed on respective opposite sides of said rack portion.

9. A link device according to claim 8, wherein said guiding units further comprise means for immobilizing said rings against rotation and against movement in translation in a direction parallel to the axis of the half-link.

10. A link device according to claim 1, wherein said driving unit includes a motor with an output shaft that is mechanically connected to said shaft of said rotary member.

11. A link device according to claim 1, wherein said driving unit includes an arm orthogonal to said drive shaft and one end of which is fastened to said drive shaft and the other end of which is slidably mounted in a bearing attached to a pivot fixed relative to a casing.

12. A link device according to claim 1, wherein said driving unit includes an arm orthogonal to said drive shaft and a first end of which is fastened to said shaft and the other end of which is fastened to a roller constrained to move in a fixed slot.

13. A variable pitch guide vane control device comprising a link device comprising:
   a first half-link including a first end connected to a driving system and a second end;
   a second half-link including a first end connected to a driven system and a second end;
   a rotary displacement member including a rotator shaft and a rotary head cooperating with said second ends of said half-links to bring about opposite movement of said half-links;
   bearing means in which said rotator shaft is mounted
   respective means for guiding said two half-links in translation in at least two parallel directions, said guiding means being mechanically connected to said bearing means; and
   means for driving said shaft in rotation in both directions in accordance with a predetermined relationship.

14. A turbomachine compressor comprising a link device comprising:
   a first half-link including a first end connected to a driving system and a second end;
   a second half-link including a first end connected to a driven system and a second end;
   a rotary displacement member including a rotator shaft and a rotary head cooperating with said second ends of said half-links to bring about opposite movement of said half-links;
   bearing means in which said rotator shaft is mounted;
   respective means for guiding said two half-links in translation in at least two parallel directions, said guiding means being mechanically connected to said bearing means; and
   means for driving said shaft in rotation in both directions in accordance with a predetermined relationship.

15. A turbomachine comprising a link device comprising:
   a first half-link including a first end connected to a driving system and a second end;
   a second half-link including a first end connected to a driven system and a second end;
   a rotary displacement member including a rotator shaft and a rotary head cooperating with said second ends of said half-links to bring about opposite movement of said half-links;
   bearing means in which said rotator shaft is mounted;
   respective means for guiding said two half-links in translation in at least two parallel directions, said guiding means being mechanically connected to said bearing means; and
   means for driving said shaft in rotation in both directions in accordance with a predetermined relationship.

\* \* \* \* \*